March 19, 1957 — C. A. MENKENS — 2,785,496
FREE-SLIDING TROLLING SPINNER
Filed Jan. 27, 1956
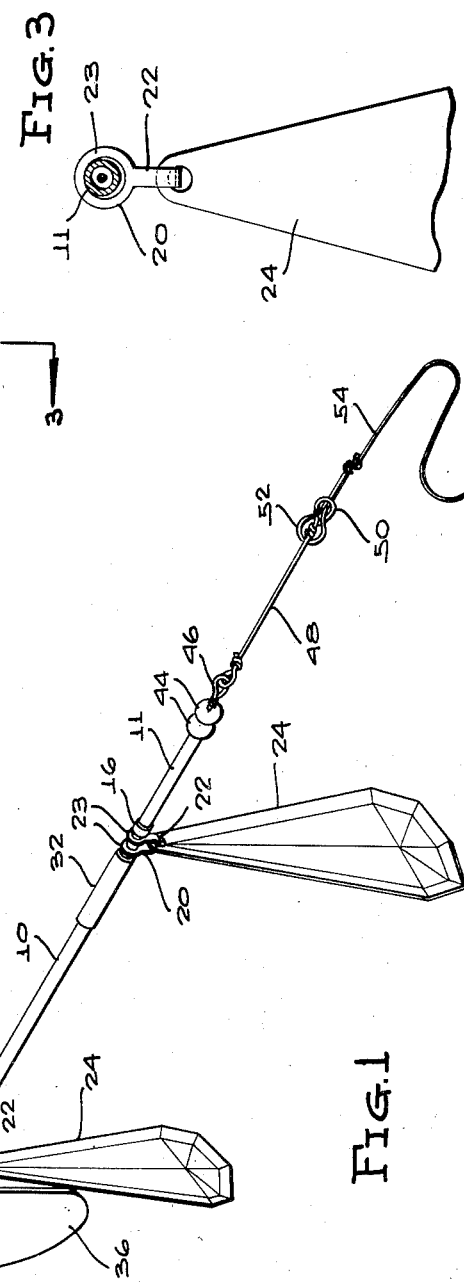
INVENTOR.
CARL A. MENKENS
BY
McMorrow, Berman & Davidson
ATTORNEYS

United States Patent Office

2,785,496
Patented Mar. 19, 1957

2,785,496

FREE-SLIDING TROLLING SPINNER

Carl A. Menkens, Winchester, Oreg.

Application January 27, 1956, Serial No. 561,791

3 Claims. (Cl. 43—42.19)

This invention relates to fish lures, and more particularly has reference to a freely sliding trolling spinner, summarized briefly as follows:

An elongated, small diameter tubular member, preferably flared at opposite ends thereof, is adapted at locations spaced longitudinally thereof for the rotatable mounting of trolling spinners thereupon. Secured to one end of the tubular member is a depending rudder, for the purpose of holding the tubular member against rotational movement that might tend to twist an associated fishing line. A fishing line is connected to one end of an elongated wire element, extending through the tubular member and formed to a diameter substantially less than the inner diameter of the tubular member. Connectable to the other end of the wire member is a hook, lure, or equivalent hooking device. The wire element is freely slidable in an axial direction with respect to the tubular member, and stop means is associated with said wire element preventing the same from sliding axially in one direction, that is, in a direction toward the hook, during trolling. The tubular member is, however, freely slidable in an opposite direction, so that when a fish takes the hook and makes a run with the same, the wire element will slide out of the tubular member, with the line running freely through the tubular member, thus to, in effect, run the trolling spinner a substantial distance along the line away from the hook, so that the spinner will not constitute an aid to the fish in the attempts made by the fish to free itself from the hook.

The device is particularly adapted for use as one of the larger types of trolling spinners, though it is not necessarily restricted to this use, and the main object of the construction is to permit the fish to run and make its fight for freedom without taking the spinner with it. It has been found, in this regard, that when a fish leaps out of the water after being hooked, and tries to shake the hook or plug loose from its mouth, the fish can disengage itself from the hook more easily when it is working against the weight of a heavy lure. This is particularly true of fish having tender mouths. Further, the situation arises when a fish is not hooked well. In accordance with the invention, the arrangement wherein the run made by the fish after being hooked shifts the spinner a substantial distance away from the hook and eliminates the spinner as an aid in disengaging the hook from the fish's mouth, due to the fact that when the fish leaps into the air, it takes with it much less weight than it otherwise would.

A more specific object of the invention is to provide a trolling spinner of the type referred to that will be readily applied to or disengaged from the associated line and hook, whenever desired.

Another object is to provide a device of the nature referred to which will permit free rotation movement of longitudinally spaced spinners, with the tubular member not only providing a guide through which the line may freely move after the fish has been hooked, but also providing a support on which a plurality of spinners may be rotatably mounted through the means of clevises shaped particularly to turn freely upon selected portions of the tubular member.

In carrying out a further object of the invention, it is proposed to permit, in a preferred form of the device, ready separation of different sections of the tubular member, to facilitate storage thereof.

Still another object is to provide upon the tubular member rudder means which will stabilize the same against rotational movement during trolling.

Yet another object is to so form the tubular member that it may itself be imparted fish-attracting characteristics, through the provision of a suitable color combination thereon, the use of fluorescent paint, etc.

Other objects will appear from the following description, the claims appended thereto, and from the annexed drawing, in which like reference characters designate like parts throughout the several views, and wherein:

Figure 1 is a perspective view of a trolling spinner formed according to the present invention;

Figure 2 is an enlarged longitudinal sectional view of the spinner, portions being broken away; and Figure 3 is an enlarged transverse sectional view on line 3—3 of Figure 2.

The reference numeral 10 designates an elongated tubular member, of small inner and outer diameters in relation to the length thereof, having flared ends 12, 14 so as to provide tapered throats at opposite ends of the bore of the member.

Integrally formed upon the tubular member, adjacent one end thereof, is a collar 16, and a similar collar 18 is formed upon the same adjacent the opposite end. Freely rotatably upon the tubular member, adjacent the respective collars, are U-shaped clevises 20, each of these being formed from a single piece of bendable sheet metal material or the like, having a reduced intermediate portion 22 integrally formed at opposite ends thereof with enlarged, circular portions having openings loosely receiving the tubular member as shown to best advantage in Figure 3. As a result, the clevises, with their circular end portions disposed in planes normal to the axis of the tubular member, and with their bight portions spaced laterally, outwardly from the tubular member, are adapted to support for rotational movement upon the tubular member spinner members 24. These can be of any desired shape, the shapes illustrated being conventional per se.

Due to the arrangement illustrated, the spinner members are spaced apart from one another longitudinally of the tubular member, and are individually freely rotatable upon the same.

In the illustrated example, the tubular member comprises tube sections 26, 28, with the section 26 being substantially shorter than the section 28, said sections having abutting inner ends as shown at 30 in Figure 2. To provide a joint between the sections there is utilized a sleeve 32 which may be fixed to one of the other sections, with the sleeve passing over the joint 30 to frictionally interengage the sections and thereby hold the same against relative separation.

The purpose of forming the tubular member with end-abutting sections is to permit its separation when it is to be stored in a tackle box or the like, the overall length of the trolling spinner being shortened in this manner under these circumstances. However, the device can be made without a joint if desired.

At 34 there has been designated a second sleeve, fixedly secured to the tube section 28 adjacent the flared end 14, thereof and formed integrally or otherwise made rigid with a depending rudder 36. The purpose of the rudder is to prevent rotational movement of the tubular member during trolling, thus to reduce the possibility of turning or twisting of the fishing line to a minimum.

An elongated wire element has been designated at 38, and in the preferred embodiment is slightly longer than the tubular member, the ends of the wire element projecting short distances beyond the flared ends of the tubular member. The wire element is of a diameter substantially smaller than the inner diameter of the tubular member, thus to permit the wire element to pass freely through the tubular member under circumstances to be described in detail hereinafter. At one end, the wire element has a loop or eye 40 to which is connectable a fishing line or leader 42. At the opposite end, the wire element has freely rotatable thereon a pair of beads 44 of a diameter greater than the inner diameter of the tubular member. Adjacent the beads, the end of the wire element has an eye 46 to which is loosely pivotally connected a short length of wire, providing a wire element which will be engageable by the trolling spinner member shown at the right in Figures 1 and 2. This is to prevent chafing of a fishing line by the particular spinner member, during use of the device.

At its opposite ends, the short wire member 48 has an eye 50 connected to a loop 52 of a leader 54 connected at its other end to a hook 56. In place of the hook a hook-equipped plug or lure may be employed.

In use, the hook means 48, 54, 56 is connected to one end of the wire element 38, and said wire element is extended through the tubular member and connected to the fishing line. During ordinary trolling operations, the tubular member will be engaged against the beads 44, which operate as a swivel to prevent the fishing line from twisting. Although the tubular member is free to shift in an axial direction upon the fishing line and wire element, it will be limited in its movement toward the hook by the abutment means constituted by beads 44. The spinner members are thus maintained at a predetermined distance from the hook, when the lure is being drawn through the water.

When a fish takes the hook, its tendency is to run, in a direction away from the trolling spinner, that is, to the right in Figures 1 and 2. As a result, the wire element is pulled through the tubular member to the right in Figure 2, and thereafter, the line 42 passes freely through the tubular member. The eye 40, of course, is of a size such as to permit it to pass freely through the tubular member.

As a result, when the fish makes its run preliminary to making leaps in its fight for freedom, it pulls the hook away from the trolling spinner a substantial distance, so that the trolling spinner is no longer at the end of the line on which the hook is attached. Heretofore, the trolling spinner has been kept at a location adjacent the hook, and when the fish leaps into the air and carried with it the trolling spinner, the result, has been, that the weighted spinner aids in disengaging the hook from the fish's mouth. Due to the arrangement illustrated, however, when the fish ultimately makes a leap, it will not have the weight of the spinner with it, thus tending to retain the hook in the mouth.

The tubular member, as will be understood, can be of any color combination, thus providing added attraction for the fish, and this is true also of the rudder and of the spinner members.

The coloring of the tubular member and blade can, of course, be luminescent to add to the attractiveness thereof.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted with the scope of the appended claims.

What is claimed is:

1. A trolling spinner comprising an elongated tubular member; at least one spinner member freely rotatable thereupon, said tubular member being formed open at its opposite ends; an elongated wire element extending through the tubular member, said wire element being of a diameter substantially smaller than the inner diameter of the tubular member, thus to permit the wire element to pass freely through the tubular member; stop means on one end of the wire element engaging one end of the tubular member to hold the tubular member and wire element against relative axial movement in one direction; hook means connected to said one end of the wire element; a rudder mounted upon the tubular member at the other end thereof; and a line connected to the other end of said wire element.

2. A trolling spinner comprising an elongated tubular member formed open at its opposite ends, said tubular member being flared at said ends thereof; collars on said tubular members spaced apart along the length of the tubular member; spinner members freely rotatable upon the tubular member adjacent said collars; a rudder secured fixedly to the tubular member at one end thereof; a wire element extending within the tubular member, said wire element being of a substantially smaller diameter than the inner diameter of the tubular member for free passage of the wire elements through the tubular member; stop means carried by the wire element at one end thereof, engaging one end of the tubular member to hold the tubular member against movement longitudinally of the wire element in one direction; and hook means carried by the wire element at one end thereof, the other end of the wire element being adapted for connection of a fishing line thereto.

3. A trolling spinner comprising an elongated tubular member formed open at its opposite ends, said tubular member being flared at said ends thereof; collars on said tubular members spaced apart along the length of the tubular member; spinner members freely rotatable upon the tubular member adjacent said collars; a rudder secured fixedly to the tubular member at one end thereof; a wire element extending within the tubular member, said wire element being of a substantially smaller diameter than the inner diameter of the tubular member for free passage of the wire element through the tubular member; stop means carried by the wire element at one end thereof, engaging one end of the tubular member to hold the tubular member against movement longitudinally of the wire element in one direction; and hook means carried by the wire element at one end thereof, the other end of the wire element being adapted for connection of a fishing line thereto, said tubular member comprising cooperating tube sections disposed in end-abutting relation, and sleeve means receiving the tube sections and extending over the abutting ends of the tube sections to hold the same assembled with one another.

References Cited in the file of this patent

UNITED STATES PATENTS

| 706,941 | Hildebrandt | Aug. 12, 1902 |
| 2,170,788 | Augenblick | Aug. 22, 1939 |
| 2,621,437 | Pedranti | Dec. 16, 1952 |